Figure 1:
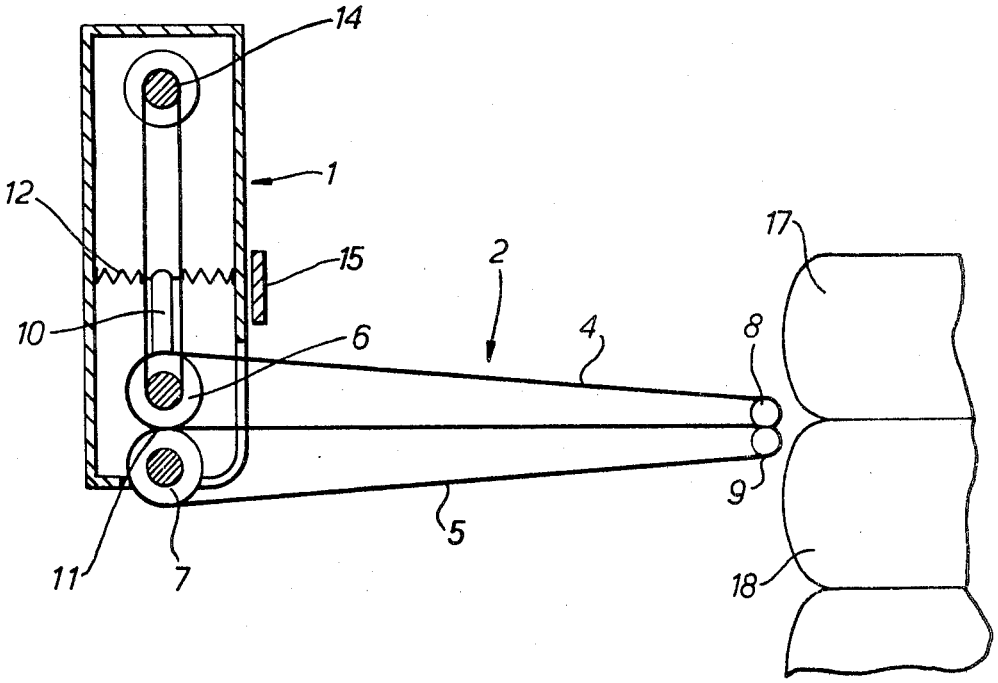
Figure 2:
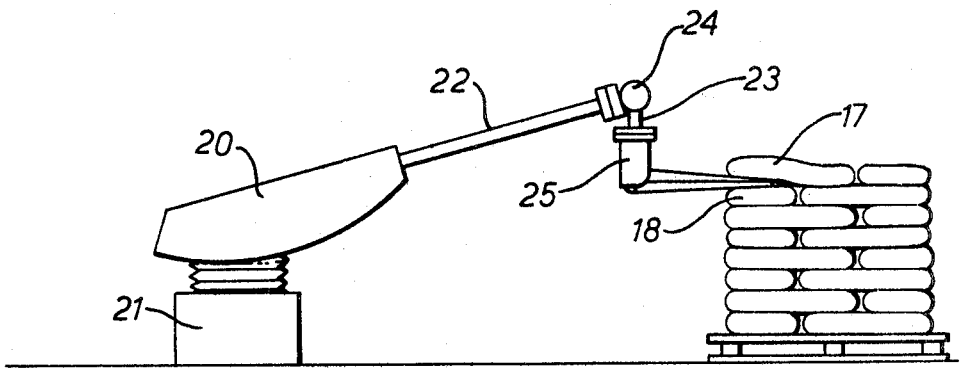

United States Defensive Publication [19] (H) [11] T998,009

Bevan [43] Sep. 2, 1980

[54] HANDLING DEVICES

[76] Inventor: Ronald Bevan, "Whitehaven", 76 Hay St., Steeple Morden, Royston, Hertfordshire, United Kingdom

[21] Appl. No.: 60,124

[22] Filed: Jul. 24, 1979

[30] Foreign Application Priority Data

Oct. 27, 1978 [GB] United Kingdom ..... 42270/78
Jun. 28, 1979 [GB] United Kingdom ..... 22512/79

[51] Int. Cl.[3] ..... B65G 57/09; B65G 57/16
[52] U.S. Cl. ..... 414/77; 414/114; 414/124

[57] ABSTRACT

In a machine for stacking or destacking sacks filled with particulate materials, a device for handling the sacks is disclosed which comprises a body portion from which extends a platform having upper and lower surfaces provided by two belts placed back to back and driveable in opposite directions so that the outer surfaces move in the same direction. When the extended edge of the platform is positioned between a sack of one layer and its underlying layer, i.e. so that the sack rests on the upper belt and the lower belt of the platform rests on the underlying layer, the platform may be drawn into or out from the interface between the sack and its underlying layer by driving the belts in the appropriate directions. The body portion is secured to a robot arm for moving and positioning the handling device, movement of which is preferably sychronized with movement of the platform into or out from the interface so as to minimize any sliding between the platform and the sacks. During automatic destacking operations, location of the interface between two layers of sacks may be facilitated by mounting the platform so that it can tilt slightly away from the horizontal.

7 Claims, 1 Sheet Drawing,

11 Pages Specification

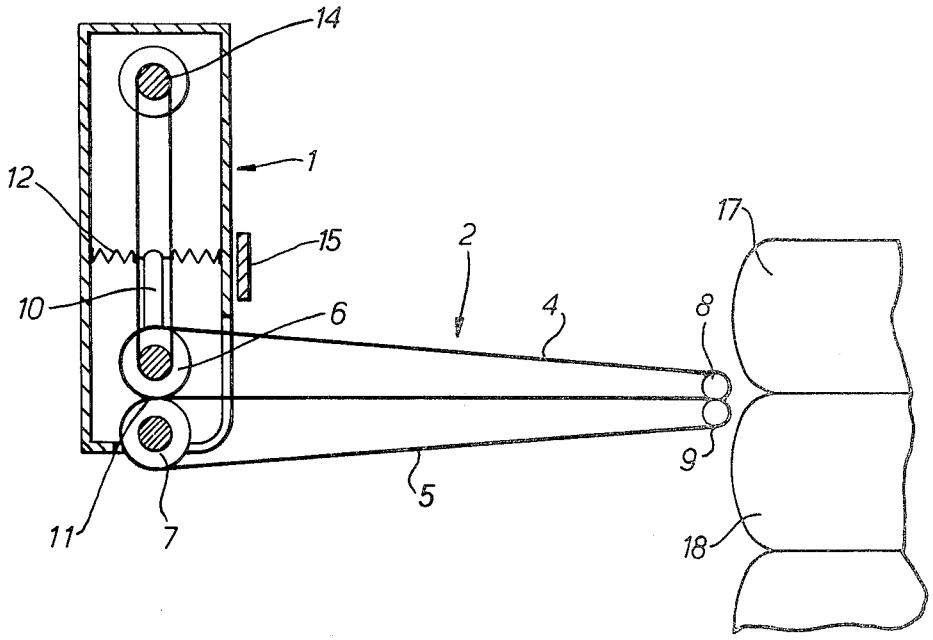

The file of this unexamined application may be inspected and copies thereof may be purchased (849 O.G. 1221, Apr. 9, 1968).